(12) United States Patent
Shin

(10) Patent No.: US 9,241,087 B2
(45) Date of Patent: Jan. 19, 2016

(54) MOBILE TERMINAL AND METHOD FOR OPERATING THE SAME INCLUDING STARTING AND ENDING A GROUPING IMAGE PROCESS

(71) Applicant: LG ELECTRONICS INC., Seoul (KR)

(72) Inventor: Yongkyoung Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/089,488

(22) Filed: Nov. 25, 2013

(65) Prior Publication Data

US 2014/0211043 A1 Jul. 31, 2014

(30) Foreign Application Priority Data

Jan. 31, 2013 (KR) ........................ 10-2013-0011277

(51) Int. Cl.
*H04N 5/232* (2006.01)
*H04N 5/222* (2006.01)
*H04N 5/225* (2006.01)
*H04N 1/21* (2006.01)

(52) U.S. Cl.
CPC ...................................... *H04N 1/21* (2013.01)

(58) Field of Classification Search
None
See application file for complete search history.

(56) References Cited

U.S. PATENT DOCUMENTS

| | | | |
|---|---|---|---|
| 2004/0001708 A1 | 1/2004 | Hatori | |
| 2004/0205286 A1* | 10/2004 | Bryant et al. | ...................... 711/1 |
| 2005/0117031 A1* | 6/2005 | Russon et al. | ............. 348/231.2 |
| 2007/0223049 A1 | 9/2007 | Araya et al. | |
| 2011/0157420 A1* | 6/2011 | Bos et al. | ................... 348/231.2 |
| 2012/0147214 A1 | 6/2012 | Iwasaki | |
| 2012/0249853 A1* | 10/2012 | Krolczyk et al. | ........ 348/333.01 |
| 2013/0239063 A1* | 9/2013 | Ubillos et al. | ................. 715/838 |
| 2014/0149898 A1* | 5/2014 | DeLuca et al. | ................ 715/764 |

FOREIGN PATENT DOCUMENTS

JP 2010-279047 A 12/2010

* cited by examiner

*Primary Examiner* — Aung S Moe
*Assistant Examiner* — Euel Cowan
(74) *Attorney, Agent, or Firm* — Birch, Stewart, Kolasch & Birch, LLP

(57) ABSTRACT

A method for controlling a mobile terminal, and which includes entering, via a camera of the mobile terminal, a capture mode; receiving, via a controller of the mobile terminal, a start input for starting a grouping image process; capturing, via the camera, at least one image; receiving, via the controller, an end input for ending the grouping image process; and storing, in a memory associated with the mobile terminal, the at least one image captured between the start input and the end input in a group.

18 Claims, 20 Drawing Sheets

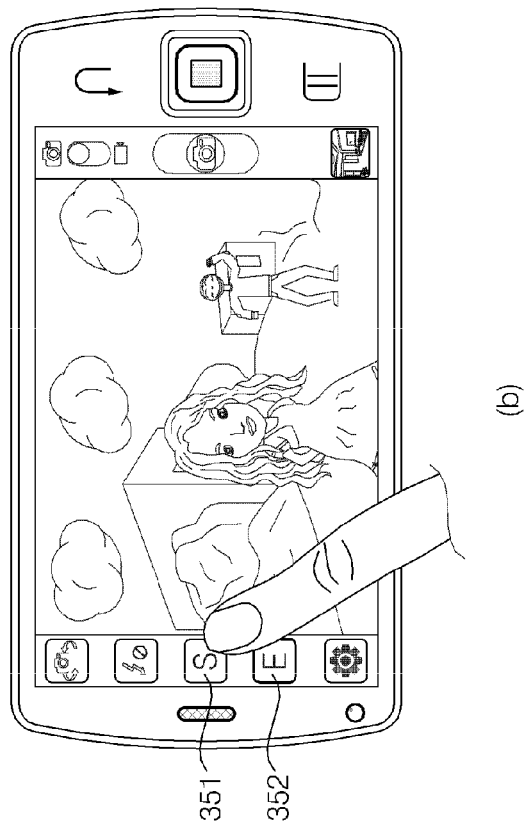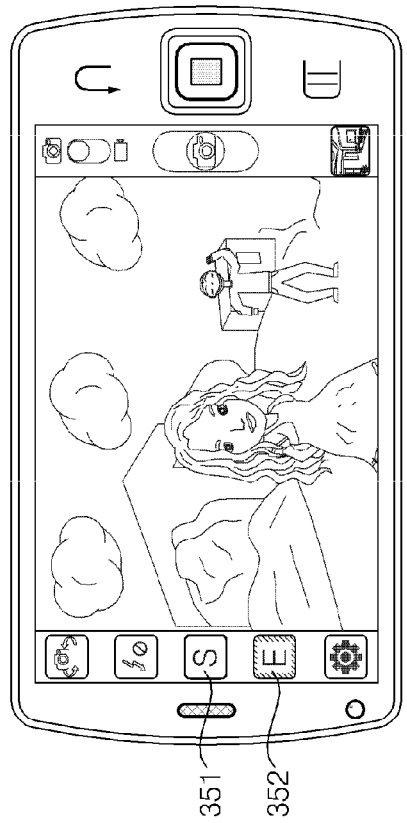
FIG. 6

FIG. 9
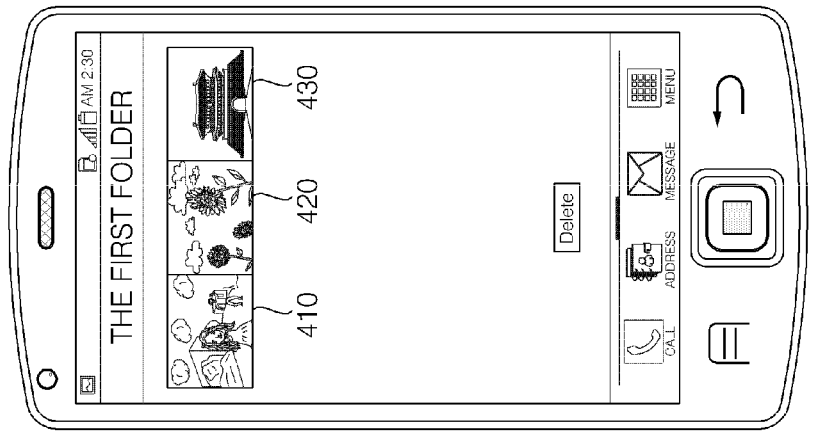
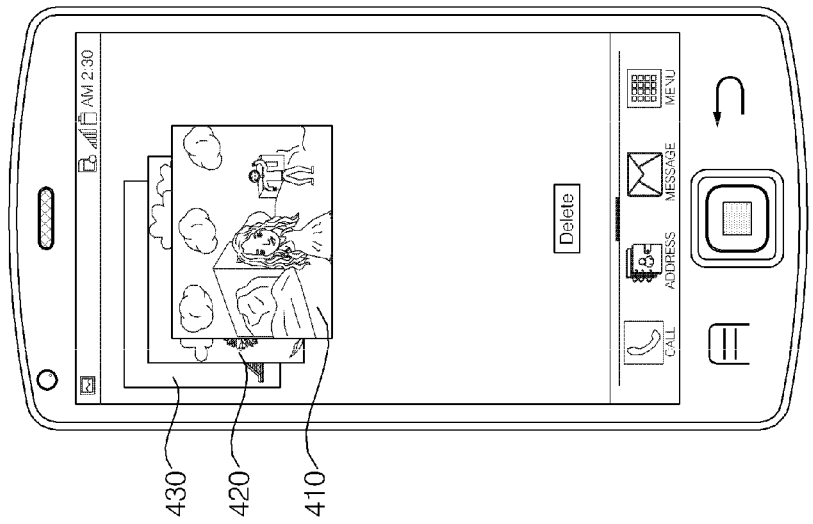

FIG. 10
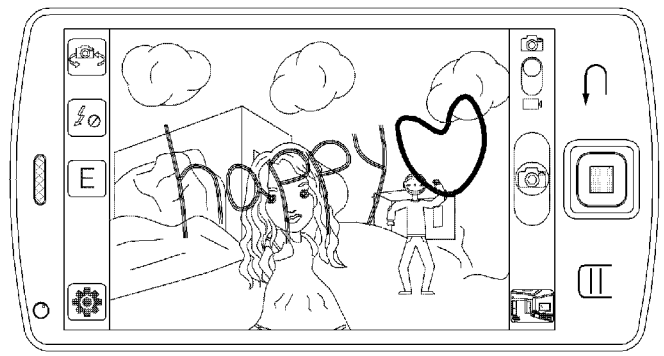
(a)
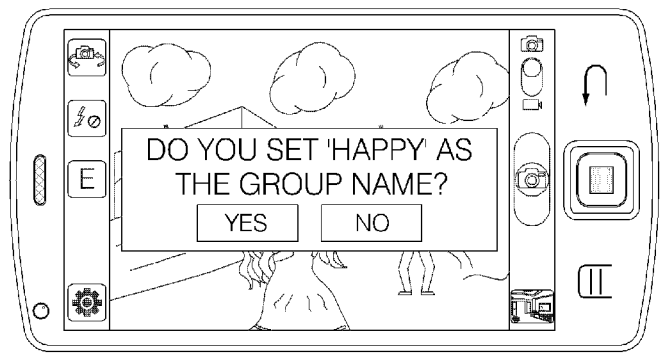
(b)
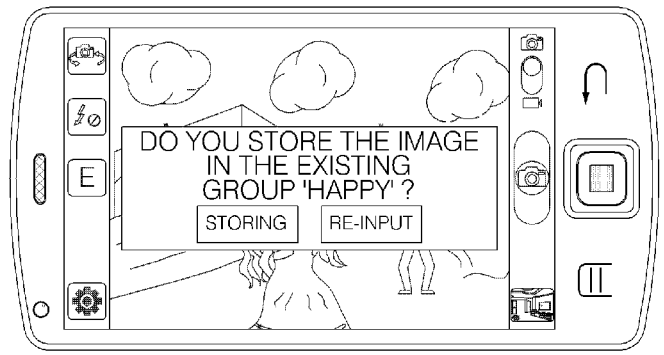
(c)

FIG. 12
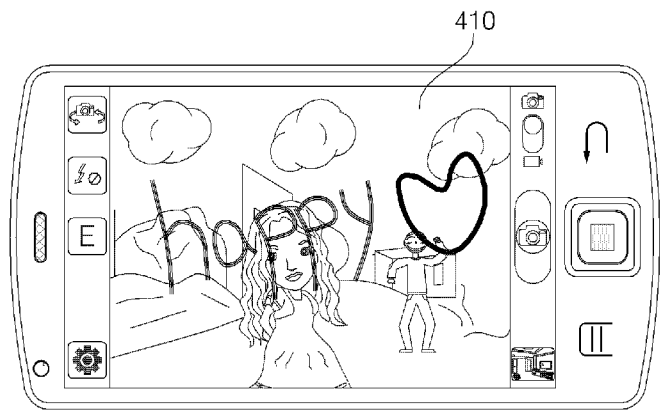
(a)
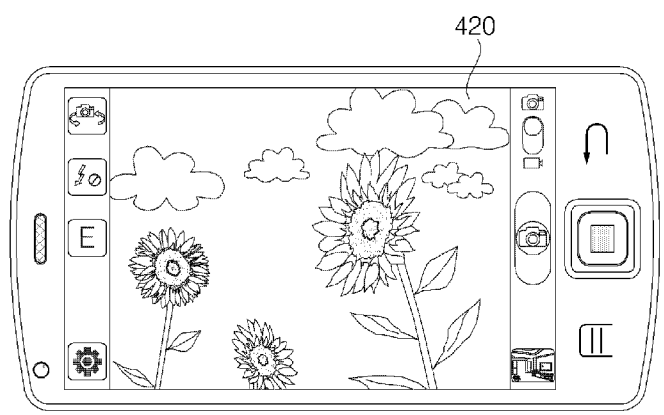
(b)
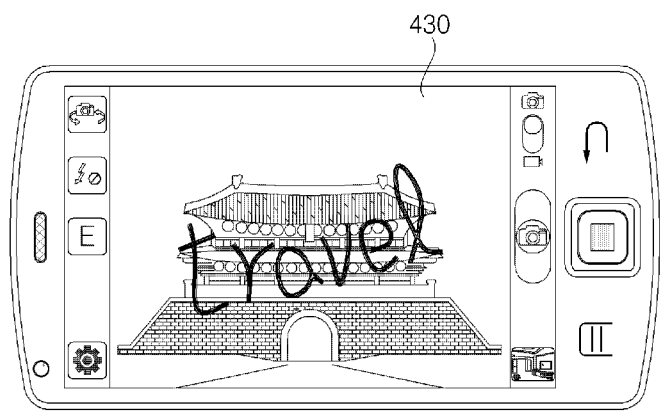
(c)

FIG. 18
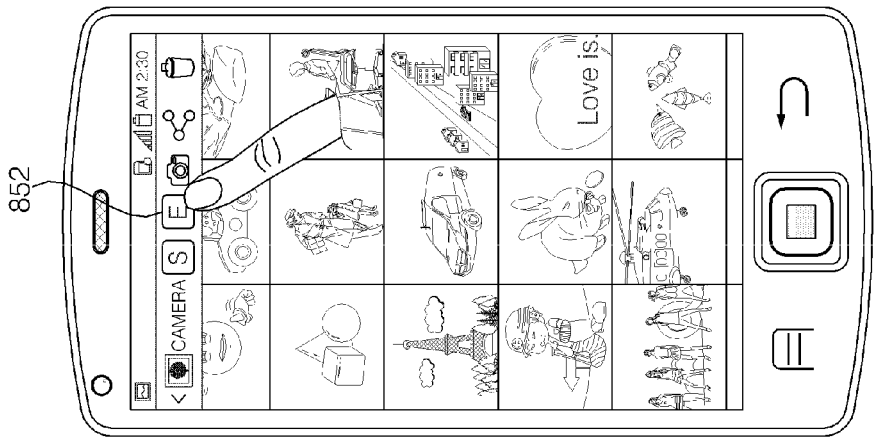
(c)
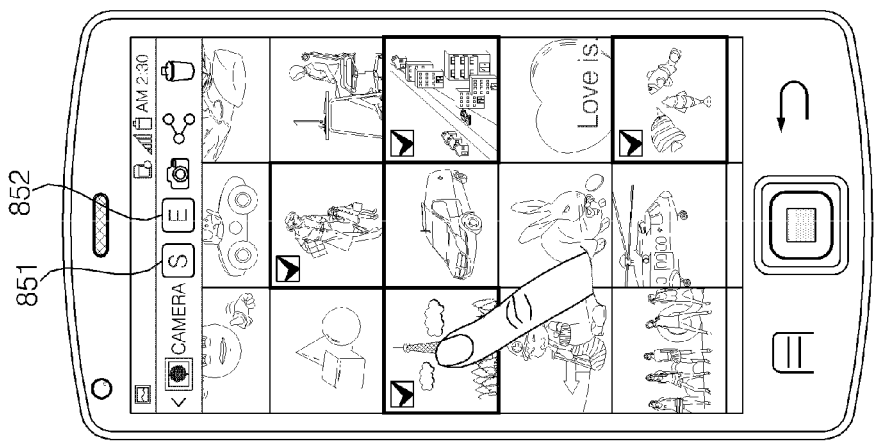
(b)
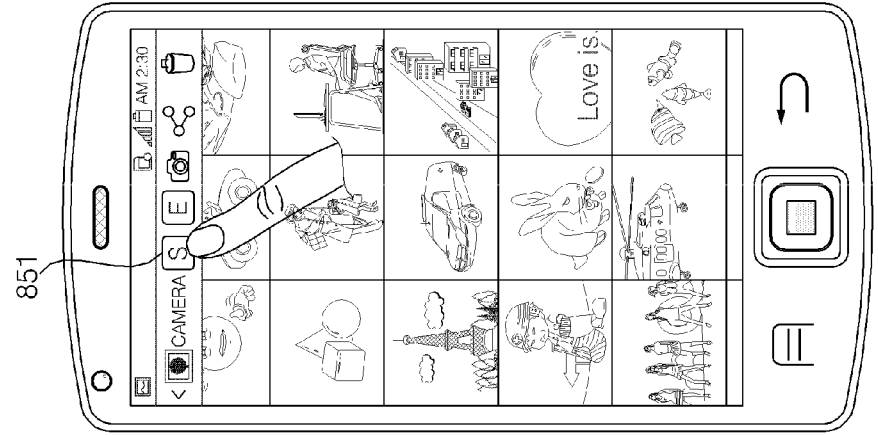
(a)

MOBILE TERMINAL AND METHOD FOR OPERATING THE SAME INCLUDING STARTING AND ENDING A GROUPING IMAGE PROCESS

CROSS-REFERENCE TO RELATED APPLICATION

This application claims the benefit of Korean Patent Application No. 10-2013-0011277, filed on Jan. 31, 2013 in the Korean Intellectual Property Office, the disclosure of which is incorporated herein by reference.

BACKGROUND OF THE INVENTION

1. Field of the Invention

The present invention relates to a mobile terminal and operating method of the same for managing a captured image by using an image grouping function efficiently.

2. Description of the Related Art

A mobile terminal is a portable device having at least one of function to perform voice and video communication, a function to receive and output information and a function to store data.

As the function has been diversified, a mobile terminal having complex functions such as a function to capture still or moving images (i.e., photographs or videos), a function to reproduce music or video file, a game function, a function to receive broadcasts, a wireless internet function has been multimedia player.

Also, because a resolution of camera being included in a mobile terminal is higher, a user now captures many more still or moving images. However, the user has trouble to move stored image in a basic folder to other folder and delete stored image in the basic folder for managing captured images in a group.

SUMMARY OF THE INVENTION

Therefore, the present invention has been made in view of the above problems, and it is an object of the present invention to provide a mobile terminal and an operating method of the same for storing and managing captured images efficiently by using an image grouping function in a capture mode and an album mode.

It is another object of the present invention to provide a mobile terminal and a method for operating the same, which can increase user convenience.

In accordance with an aspect of the present invention, the above and other objects can be accomplished by the provision of a method for operating a mobile terminal, the method including entering a capture mode, receiving a start input for an image grouping, capturing at least one of images, receiving an end input for the image grouping and storing at least one of images captured between the start input and the end input in a group.

In accordance with another aspect of the present invention, there is provided a method for operating a mobile terminal including entering an album mode, displaying an image list of a first group including images, receiving a start input for an image grouping, selecting at least one of the images, receiving an end input for the image grouping and storing at least one of the images selected between the start input and the end input in a second group.

In accordance with another aspect of the present invention, there is provided a mobile terminal including a camera for capturing an image and a controller for receiving a start and an end input for an image grouping and storing at least one of the images captured between the start input and the end input is stored in a group.

BRIEF DESCRIPTION OF THE DRAWINGS

The above and other objects, features and other advantages of the present invention will be more clearly understood from the following detailed description taken in conjunction with the accompanying drawings, in which:

FIGS. 5 to 15 are views referred to for describing the method for operating the mobile terminal, illustrated in FIG. 15;

FIGS. 17 to 20 are views referred to for describing the method for operating the mobile terminal, illustrated in FIG. 16.

DETAILED DESCRIPTION OF THE PREFERRED EMBODIMENTS

Exemplary embodiments of the present invention will be described with reference to the attached drawings.

A mobile terminal as described in this specification includes a mobile phone, a smart phone, a laptop, a digital broadcast terminal, a Personal Digital Assistant (PDA), a Portable Multimedia Player (PMP), a navigation device, or the like. The words "module" or "unit", which are appended to terms describing components, are merely used for ease of explanation of the present invention and have no specific meaning or function with respect to the components. Thus, the words "module" and "unit" can be used interchangeably.

Figure 1:
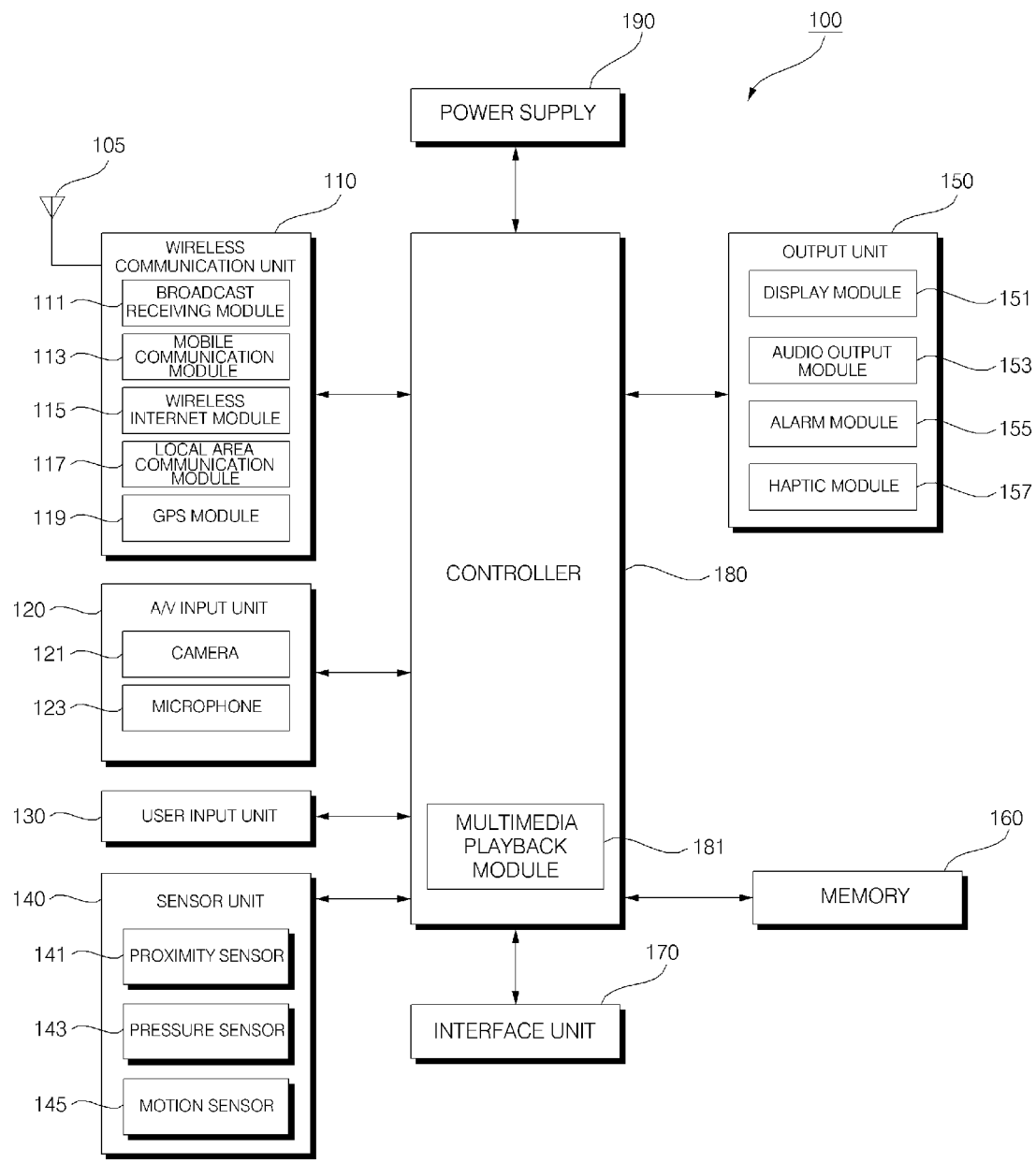
FIG. 1 is a block diagram of a mobile terminal according to an embodiment of the present invention.

FIG. 1 is a block diagram of a mobile terminal according to an embodiment of the present invention. Referring to FIG. 1, the mobile terminal 100 includes a wireless communication unit 110, Audio/Video (AV) input unit 120, a user input unit 130, a sensing unit 140, an output unit 150, a memory 160, an interface unit 170, a controller 180, and a power supply unit 190. In actual applications, two or more of these components can be combined into one component or one component can be divided into two or more components as needed.

The wireless communication unit 110 includes a broadcast receiving module 111, a mobile communication module 113, a wireless internet module 115, a local area communication module 117, and a Global Positioning System (GPS) module 119.

The broadcast receiving module 111 receives at least one of a broadcast signal and broadcast-related information from an external broadcast management server through a broadcast channel. The broadcast management server may be a server that generates and transmits at least one of a broadcast signal and broadcast-related information or a server that receives and transmits at least one of a broadcast signal and broadcast-related information, which have been previously generated, to a terminal.

The broadcast signal can not only include a TV broadcast signal, a radio signal, a data broadcast signal but also include a broadcast signal combined a data broadcast signal into a TV or radio broadcast signal.

The broadcast-related information can be information relating to a broadcast channel, a broadcast program, or broadcast service provider. The broadcast-related information can also be provided through a mobile communication network. In this instance, the broadcast-related information can be received by mobile communication module 113. The broadcast-related information can have various forms. For example, it can be provided in the form of an Electronic Program Guide (EPG) of Digital Multimedia Broadcasting (DMB) or an Electronic Service Guide (ESG) of Digital Video Broadcast-Handheld(DVB-H) or like.

The broadcast receiving module 111 receives a broadcast signal by using a variety of broadcast systems. Specifically, the broadcast receiving module 111 can receive a digital broadcast signal by using digital broadcast systems such as Digital Multimedia Broadcasting-Terrestrial (DMB-T), Digital Multimedia Broadcasting-Satellite (DMB-S), Media Forward Link Only (MediaFLO), a Digital Video Broadcast-Handheld (DVB-H), or Integrated Services Digital Broadcast-Terrestrial (ISDB-T).

The broadcast receiving module 111 can be suitable not only for such a digital broadcast system but also all broadcast systems providing a broadcast signal. A broadcast signal and/or broadcast-related information received through the broadcast receiving module 111 can be stored in memory 160.

The mobile communication module 113 can transmit and receive a wireless signal to and from at least one of a base station, an external terminal, and server over a mobile communication network. Here, the wireless signal can include a voice call signal, a video call signal, or various types of data associated with transmission and reception of a text/multimedia message.

Further, the wireless internet module 115 is a module for wireless internet access and may be internal or external module provided to the mobile terminal 100. Wireless LAN (WLAN) (i.e., Wi-Fi), Wireless broadband (WiBro), World Interoperability for Microwave Access (WiMax), or High Speed Downlink Packet Access (HSDPA) can be used as a wireless Internet technology.

The local area communication module 117 is a module for local area communication. Bluetooth, Radio Frequency Identification (RFID), Infrared Data Association (IrDA), Ultra Wideband (UWB), or ZigBee can be used as a local area communication technology.

The GPS module 119 receives location information from a plurality of GPS satellites. Further, the AN input unit 120 is provided to input an audio or video signal and can include a camera 121 and a microphone 123.

The camera 121 processes an image frame such as a still or moving image obtained by an image sensor in a video communication mode or an image capture mode. The processed picture frame can be displayed on the display module 151.

An image frame processed in the camera 121 can be stored in a memory 160 or can be transmitted to the outside through the wireless communication unit 110. The camera 121 can include two or more cameras according to configuration of the mobile terminal.

The microphone 123 receives an external audio signal by microphone in a voice or video communication mode, a record mode, or a voice recognition mode and processes the same into electrical voice data. The processed voice data can be converted into a form transmittable to a mobile terminal base station through the mobile communication module 113 in a voice or video communication mode.

Various noise removal algorithms can be used to remove noise generated in the process of receiving an external audio signal through the microphone 123.

The user input 130 generates key input data corresponding to a key input operation that a user has performed to control the operation of the mobile terminal. The user input 130 can include key pad, dome switch, or a (resistive/capacitive) touchpad to receive a command or information through a push or touch operation by the user.

The user input 130 can also include a jog wheel, a joystick, a finger mouse, or the like. Specifically, touch pad can be referred "touch screen" in case that the touch pad forms a multilayer structure with the display module 151 described later.

The sensing unit 140 senses a current state of the mobile terminal 100 such as whether the mobile terminal 100 is opened or closed, the position of the mobile terminal 100, whether or not the user is in contact with the mobile terminal 100 and generate a sensing signal to control operation of the mobile terminal 100. For example, if the mobile terminal is a slide phone, the sensing unit 140 can sense whether the slide phone is opened or closed.

Further, the sensing unit 140 can also be responsible for sensing function associated with whether or not the power supply unit 190 is supplying power or whether or not the interface unit 170 is coupled to an external device.

The sensing unit 140 can include a detection sensor 141, a pressure sensor 143, and a motion sensor 145. The detection sensor 141 can detect an object approaching the mobile terminal 100 or whether object is present near the mobile terminal 100 without mechanical contact. The detection sensor 141 can detect an approaching object by using a change in an alternating current (AC) magnetic field or a static magnetic field, or the rate of change of capacitance.

The pressure sensor 143 can detect whether pressure is being applied to the mobile terminal 100 or can measure the magnitude of pressure. The pressure sensor 143 can be installed in a part of the mobile terminal 100 needing a detection of pressure depending on the use environment of the mobile terminal 100. If the pressure sensor 143 is installed in the display module 151, it can discriminate touch input through the display module 151 from a pressure touch input applied greater pressure than the touch input based on a signal output from the pressure sensor 143.

The motion sensor 145 detects the position, a movement or the like of the mobile terminal 100 using an acceleration sensor, a gyro sensor, or the like. With developments of micro-electromechanical system (MEMS) technology, the acceleration sensor, which can be used for the motion sensor 145, have been widely used as a device converting acceleration in one direction into an electric signal. The gyro sensor can determine a rotated direction of the mobile terminal 100 relative to a reference direction as a sensor for measuring angular speed.

The output unit 150 can output audio signals, video signals or alarm signals. The output unit 150 can include the display module 151, an audio output module 153, an alarm unit 155, and a haptic module 157.

The display module 151 display information processed in the mobile terminal 100. For example, if the mobile terminal 100 is in a voice or video communication mode, the display module 151 displays User Interface (UI) or Graphic User Interface (GUI) related to the voice or video communication. When the mobile terminal 100 is in a voice communication mode or an image capture mode, the display module 151 can individually or simultaneously display captured or received image and can display a corresponding UI or GUI.

As described above, when the display module 151 forms a multiple-layer structure with the touchpad to construct a touch screen, the display module 151 can not only be used as an output device but can also be used as an input device which allows the user to input information by touch.

If the display module 151 includes a touch screen, the display module 151 can include a touch screen panel, a touch screen panel controller, or the like. In this instance, the touch screen panel is a transparent panel externally attached to the mobile terminal 100 and can be connected to an internal bus of the mobile terminal 100.

The touch screen panel monitors touches and transmits signals corresponding to touch inputs to the touch screen panel controller. The touch screen panel controller processes the signals and transmits the resulting data to the controller 180, and the controller 180 then determines whether or not a touch input has occurred and which region of the touch screen has been touched.

The display module 151 can include electronic paper (e-paper). As a reflective display, the electronic paper has excellent visual properties resolution as ordinary ink on paper, wide viewing angle and bright white background. The electronic paper can be implemented on various type of substrate such as a plastic, metallic or paper substrate and can display and maintain an image after power is cut off. In addition, the electronic paper can increase battery life of the mobile terminal 100 because it does not require a backlight assembly. The display module 151 can include at least one of a liquid crystal display, a thin film transistor-liquid display, an organic light-emitting diode, a flexible display and a 3D display The audio output module 153 can output audio data received from the wireless communication unit 110 or stored in the memory 160 when the mobile terminal 100 is in an incoming call receiving mode, a voice or video communication mode, a record mode, a voice recognition mode, or a broadcast receiving mode. The audio output module 153 outputs audio signals regarding of functions performed by the mobile terminal 100 such as an incoming call sound, a message receipt sound. The audio output module 153 can include a speaker, a buzzer, or the like.

The alarm module 155 outputs a signal notifying the user that an event has occurred in the mobile terminal 100. Example of the event occurring in the mobile terminal 100 can include an incoming call reception, message reception, and key signal input.

The alarm module 155 outputs a signal notifying the user of the occurrence of an event in a different form from an audio signal or a video signal. When the incoming call signal is received or a message is received, the alarm module 155 can output a signal to notify the user of reception of the incoming call signal or the message. When the key signal is input, the alarm module 155 can output a signal as a feedback to the key signal input. The user can perceive the occurrence of event through the signal output from the alarm module 155. The mobile terminal 100 can also output a signal indicating the event occurrence through the display module 151 or the audio output module 153.

The haptic module 157 can generate various haptic effects which can be perceived by the user. A representative example of the haptic effect generated by the haptic module 157 is a vibration effect. When the haptic module 157 generates the vibration as a haptic effect, the haptic module 157 can change an intensity, pattern, or the like of the vibration. The haptic module 157 can synthesize different vibrations and output the resulting signal or can sequentially output different vibrations.

The haptic module 157 can generate various haptic effects such as a haptic effect obtained using a pin array that moves perpendicularly to a contact skin surface, a haptic effect obtained by injecting or sucking in air through an injection hole or a suction hole, a haptic effect obtained by grazing the surface of the skin, a haptic effect obtained through contact with an electrode, a haptic module obtained by using electrostatic force, and a haptic effect obtained by realizing the sense of heat or cold using a device capable of absorbing or generating heat. The haptic module 157 can be implemented not only to provide a haptic effect to the user through direct contact but also to enable the user to perceive a haptic effect using the kinesthetic sense of the fingers or the arms.

The memory 160 can store a program for processing and controlling by the controller 180 and can perform functions to store provisionally input or output data items (for example, a phonebook, message, still images, and moving images).

The memory 160 may include storage medium of at least one of a variety of types including a flash memory type, a hard disk type, a multimedia card micro type, a card memory type (for example, SD or XD memory), RAM, and ROM. The mobile terminal 100 can operate web storage performing a storage function of the memory 160 over the internet.

The interface unit 170 functions to interface with all external devices connected to the mobile terminal 100. Examples of the external devices connected to the mobile terminal 100 include a wired/wireless headset, an external battery charger, a wired/wireless data port, a memory card, a Subscriber Identification Module (SIM) card socket, a User Identity Module (UIM) card socket, an audio Input/Output (I/O) terminal, and an earphone.

The interface unit 170 can receive power or data from such an external device and provide the same to each internal component of the mobile terminal 100 and transmit internal data of the mobile terminal 100 to the external device.

When the mobile terminal 100 is connected to an external cradle, the interface unit 170 can be a path through which power is provided from the external cradle to the mobile terminal 100 or a path through which command signals, which the user has input on the cradle, are transmit from the external cradle to the mobile terminal 100.

The controller 180 generally controls the operation of each unit to control overall operation of the mobile terminal 100. For example, the controller 180 performs control and processing associated with voice communication, data communication, video communication, and the like. The controller 180 can include a multimedia playback module 181 for reproducing a multimedia. The multimedia playback module 181 can be implemented in the controller 180 as a hardware, or can be implemented as a software separately from the controller 180.

The power supply unit 190 receives external power or internal power by control of the controller 180 and supplies power required for operation to each component.

The mobile terminal 100 constructed as described above, including a wired/wireless communication system and a communication system based on satellite can be implemented to operate in communication system which can transmit data through frames or packets.

Figure 2:
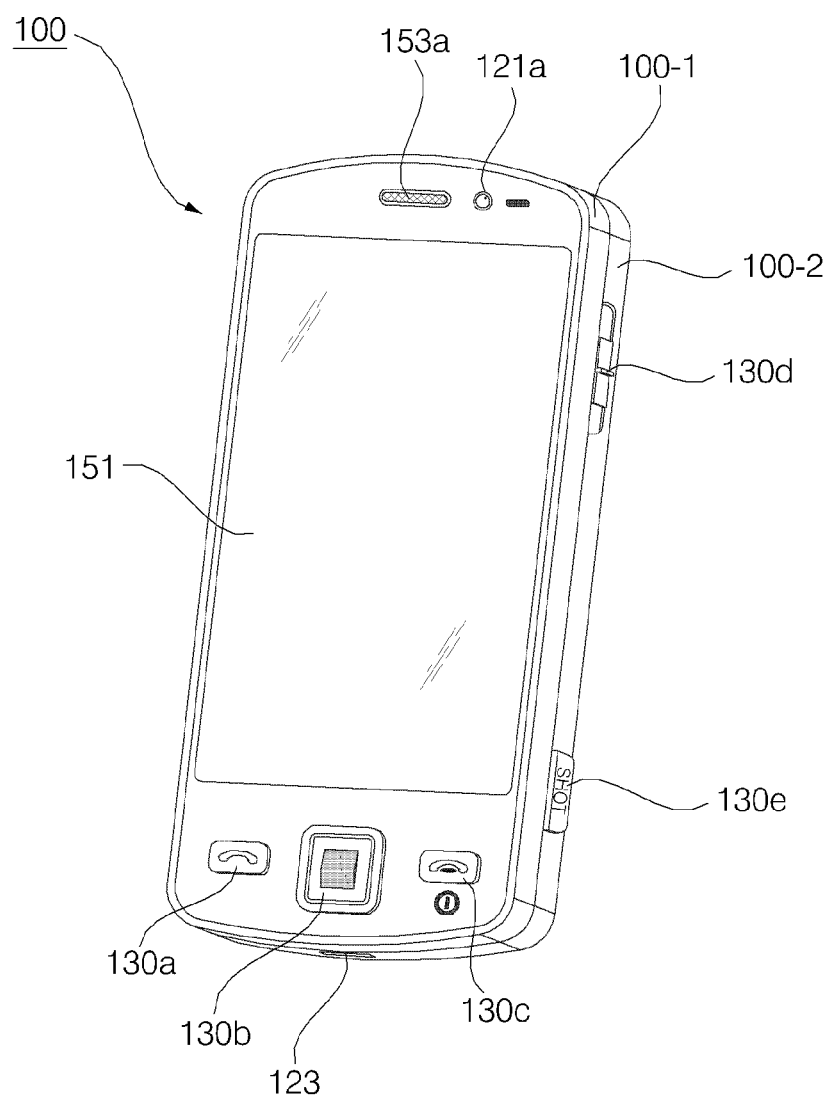
FIG. 2 is a front perspective view of the mobile terminal according to an embodiment of the present invention.
Figure 3:
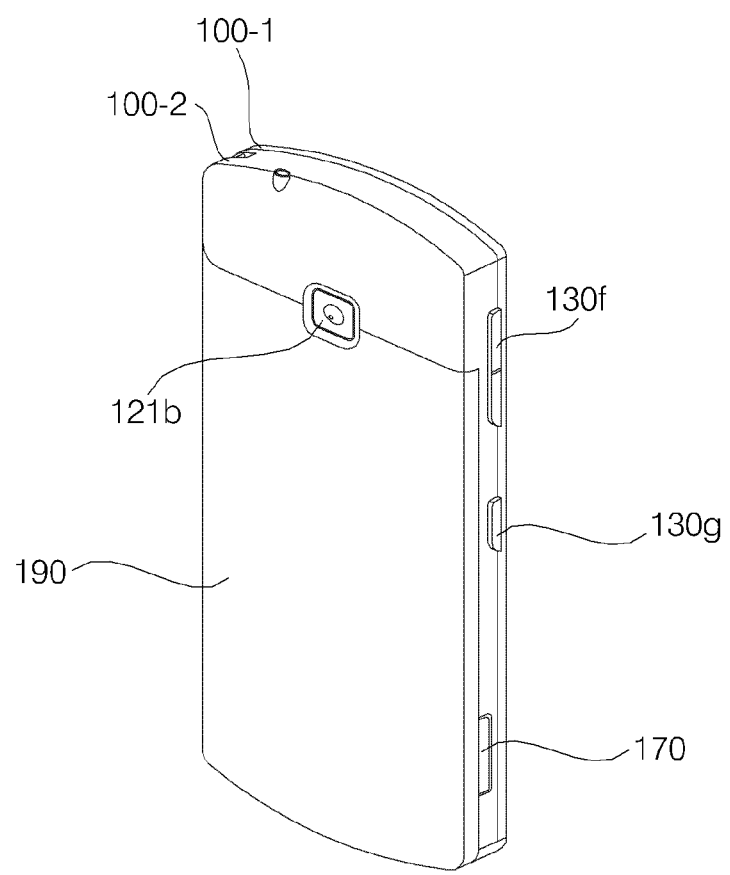
FIG. 3 is a rear perspective view of the mobile terminal shown in FIG. 2.

Next, FIG. 2 is a front perspective view of the mobile terminal 100 according to an embodiment of the present invention, and FIG. 3 is a rear perspective vies of the mobile terminal 100 shown in FIG. 2.

In the following description, the mobile terminal 100 according to an embodiment of the present invention is described in detail with reference to FIG. 2 and FIG. 3, from the viewpoint of components viewed on the external surface thereof. For ease of explanation, the following description will be given with reference to a bar type mobile terminal having a front touch screen as an example among various types of mobile terminals such as folder, bar, swing, and slider types. However, the present invention is not limited to the bar type mobile terminal and can be applied to any type of mobile terminal including the types described above.

Referring to FIG. 2, a case forming the external appearance of the mobile terminal 100 includes a front case 100-1 and a rear case 100-2. A printed circuit board and a flexible printed circuit board on which a variety of electronic parts are disposed are equipped with a space formed by the front case 100-1 and the rear case 100-2. The front case 100-1 and the rear case 100-2 can be formed through synthetic injection molding and can be formed of a metal material such as stainless steel (STS) or titanium (Ti)

A display module 151, a first audio output module 153a, a first camera 121a, and a first to third user input units 130a, 130b, 130c are disposed in a main body of the mobile terminal 100, specifically, in the front case 100-1. A fourth user input unit 130d, a fifth user input unit 130e, and a microphone 123 can be disposed in a side surface of the rear case 100-2.

The display module 151 can operate as a touch screen including touch pads overlapped with layer structure and can allow the user to input information by touch.

The first audio output module 153a can be a receiver or a speaker. The first camera 121a can be implemented to capture a still or moving image of the user or the like. The microphone 123 can be implemented to receive sound such as user voice.

The first to fifth user input unit 130a, 130b, 130c, 130d, 130e and a sixth and a seventh user input unit 130f and 130g can be collectively referred to as a user input unit 130. The user input unit 130 can be of any type, and can be operated in a tactile manner such that it is operated through tactile interaction with the user.

For example, the user input unit 130 can be implemented as a dome switch or a touch pad that can receive a command or information through a push or touch operation by the user. The user input unit 130 can be implemented as a wheel or a joystick. In terms of functionality, the first to third user input units 130a, 130b, 130c allow the user to input a command such as start, end, scroll, and the like. The fourth input unit 130d allows the user to input a selection of operation mode and the like. The fifth input unit 130e can operate as hot key for activating a particular function of the mobile terminal 100.

Referring to FIG. 3, a second camera 121b can be added to a rear face of the rear case 100-2 and the sixth and seventh user input unit 130f and 130g, and the interface unit 170 can be added to a side face of the rear case 100-2.

The second camera 121b can have a capture direction effectively opposite to that of the first camera 121a and have a pixel resolution different from that of the first camera 121a.

The interface unit 170 can be used as a channel through which the mobile terminal 100 exchanges data with an external device. In addition to antenna for communication, an antenna for broadcast signal receiving can be provided on a portion of the front case 100-1 and the rear case 100-2. Each antenna can be mounted to be retractable from the rear case 100-2.

The power supply unit 190 for supplying power to the mobile terminal 100 can be provided on a side surface of the rear case 100-2. For example, the power supply unit 190 can be combined to be detachable to the rear case 100-2 for recharging or the like, as rechargeable battery.

Although the above description has been explained that the second camera 121b or the like are provided on the rear case 100-2, the present invention is not limited to that. Even if the second camera 121b is not separately provided, the first camera 121a can be formed to be rotatable so as to capture in a capture direction of the second camera 121b.

In the following, a description will be given of the mobile terminal and method for operating the same for groping and storing a captured image according to an embodiment of the present invention. The mobile terminal and method for operating the same receiving a start input and an end input for an image grouping, and can store images captured between the start input and the end input to a group.

Figure 4:
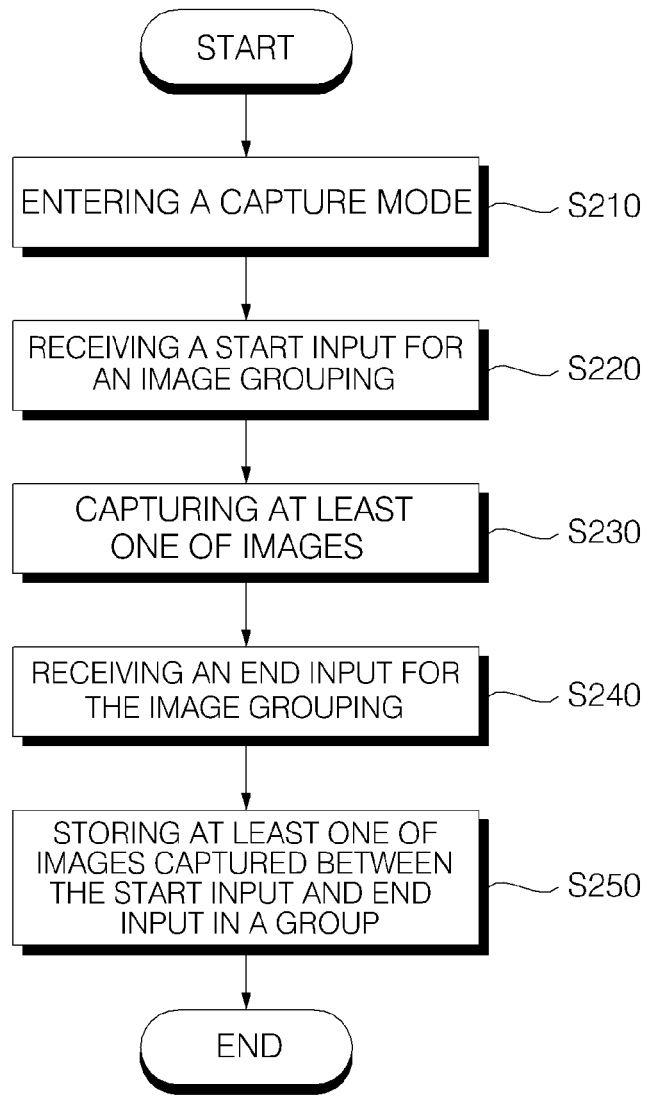
FIG. 4 is a flowchart illustrating a method for operating the mobile terminal according to an embodiment of the present invention.
Figure 5:
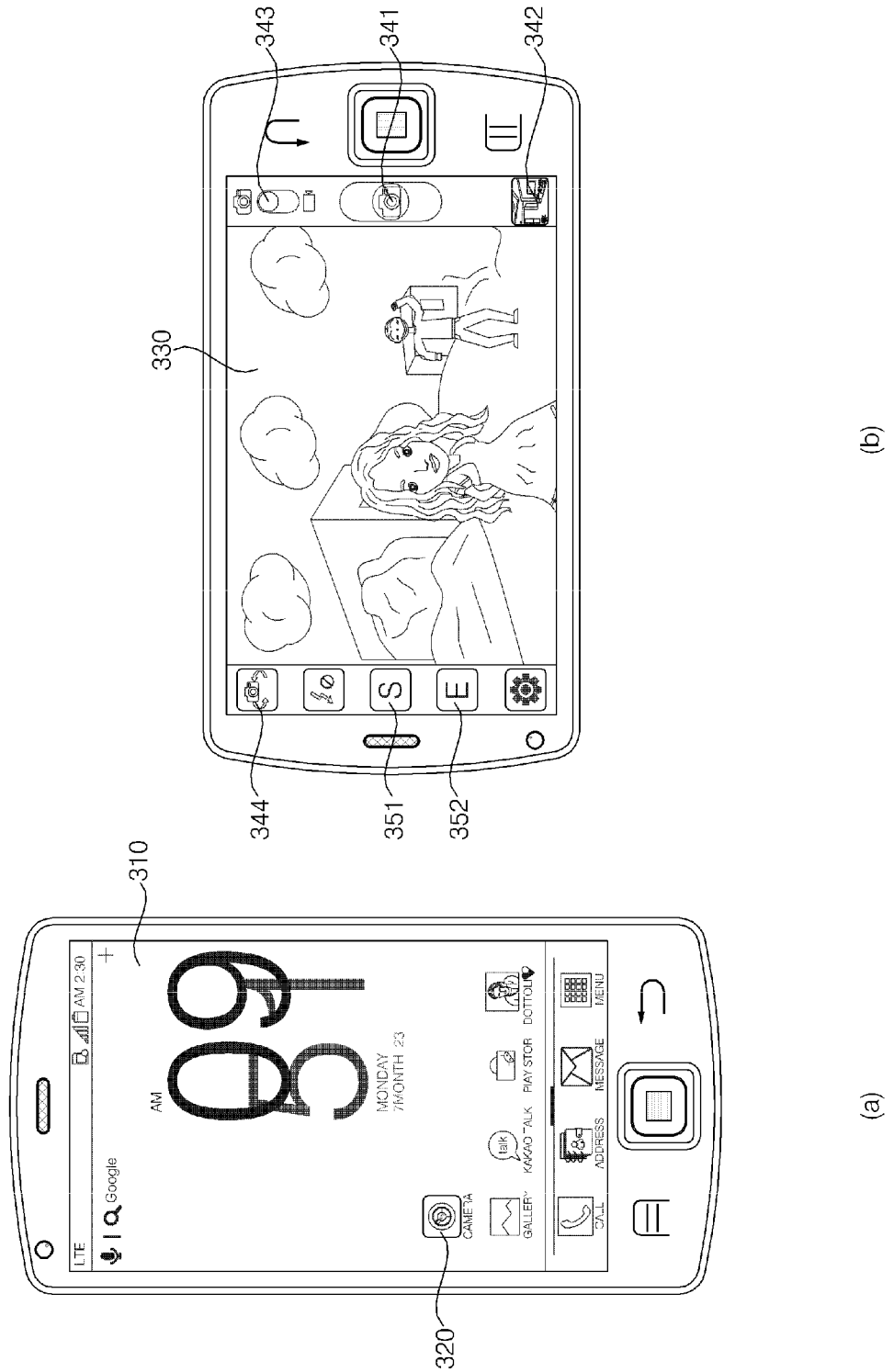

In particular, FIG. 4 is a flowchart illustrating a method for operating the mobile terminal according to an embodiment of the present invention, and FIGS. 5 to 15 are views referred for describing the method for operating the mobile terminal according to an embodiment of the present invention.

Referring to FIG. 4, the mobile terminal 100 can enter into a capture mode for capturing an image (S210). For example, if the user selects a camera application 320 on a menu screen 310, the controller 180 executes a camera program and the mobile terminal can enter into the capture mode (see FIG. 5(a)).

When the mobile terminal 100 enters into the capture mode, as illustrated in FIG. 5(b), an image 330 captured by camera and a plurality of menu objects for capture can be displayed on the display module 151.

The plurality of menu objects can include a capture object 341 for capturing, a preview object 342 illustrating a preview of a captured image, image/video switching object 343 for switching the an image capture mode and a video capture mode, a capture direction switching object 344 for switching the capture direction.

Figure 7:
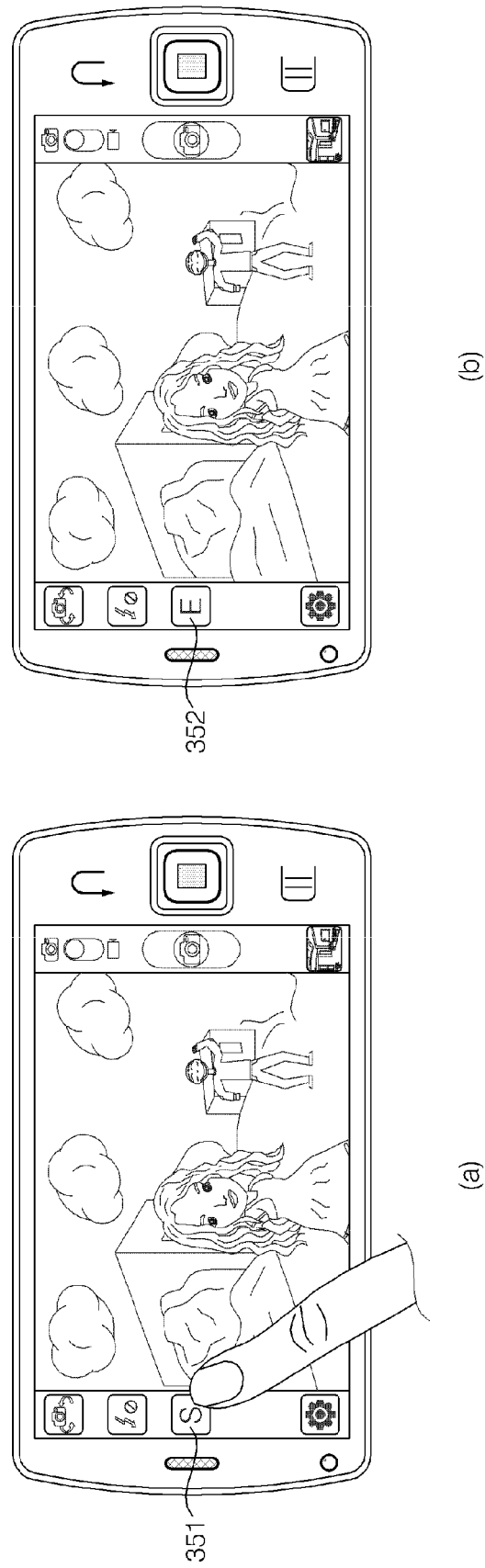
Figure 8:
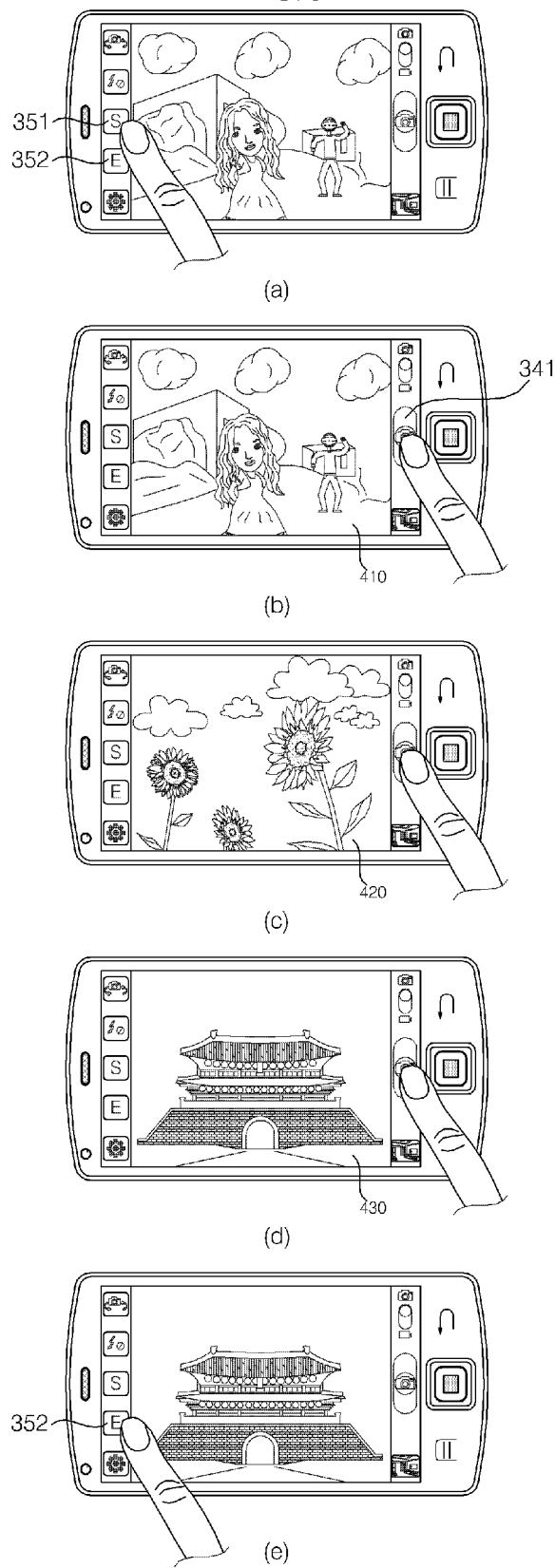

In an embodiment of the present invention, a start object 351 and an end object 352 for image grouping can be displayed on the display module 151. FIG. 6 and FIG. 7 are views illustrating an embodiment of displaying the start object 351 and end object 352.

Referring to FIG. 6, as illustrated in FIG. 6(a), the start object 351 and end object 352 can be displayed in a predetermined region of the display module 151. As illustrated in FIG. 6(b), if the mobile terminal 100 receives input selecting the start object 351, the end object 352 can be activated.

After receiving a first input selecting the start object 351, before receiving an input selecting the end object 352, if the mobile terminal 100 receives a second input selecting the start object 351 again, image grouping can be started based on the second input.

Referring to FIG. 7, the start object 351 can be displayed on a predetermined region on the display module 151 as illustrated in FIG. 7(a) and if the controller 180 receives an input selecting the start object 351, the start object 351 can be changed to the end object 352 and the end object 352 can be displayed.

If the controller 180 receives an input selecting the end object 352, the end object 352 can be changed to the start object 351 and the start object 351 can be displayed.

Again referring to FIG. 4, the controller 180 can receive a start input for image grouping in entering the capture mode (S220). For example, as illustrated in FIG. 8(a), if the user selects the start object 351, the controller can receive the selecting input and perform an operation corresponding to image grouping. For example, the controller 180 can separately set a storage area in memory 160, can create a new folder, and can control to perform memo function to be input a group name of an image group.

If the user selects the capture object 341 to capture an image, the controller 180 can capture the image (S230). For example, as illustrated in FIG. 8(b) to (d), a first image 410, a second image 420 and a third image 430 can be captured.

After the controller 180 captures the image(s), if the controller 180 receives the end input for image grouping (S240), the controller can store the image captured after receiving the start input and before receiving the end input by one group.

For example, after the first image 410, the second image 420 and the third image 430 are captured, as illustrated in FIG. 8(e), if the controller 180 receives input for selecting the end object 352, the controller can store the first image 410, the second image 420 and the third image 430 which are captured between the input selecting the start object 351 and input selecting the end object 352 in one group If the first image 410, the second image 420 and the third image 430 are stored in one group, as illustrated in FIG. 9(a), the first image 410, the second image 420 and the third image 430 can be displayed to be overlapped. The first image 410, the second image 420 and the third image 430 can be displayed to be overlapped in order of being captured.

As illustrated in FIG. 9(b), the controller 180 can create a new folder (a first folder) and can store the first image 410, the second image 420 and the third image 430 in the new folder.

The above description explains that the user input is a touch input to the start object, the capture object and the end object, but the present invention is not limited that. The start and end inputs for image grouping can include at least one of a voice input, a motion input and a memo input.

In addition, the controller 180 can recognize at least one of a voice input, a motion input and a memo input and can determine whether the recognized input is at least one of a predetermined voice, a predetermined motion and a predetermined memo and can perform an operation corresponding to that.

For example, when the user says 'start', the controller 180 can recognize the voice 'start' and can perform an operation corresponding to start for image grouping. When the user says 'capture' or 'end', the controller 180 can perform an operation corresponding to each of that.

In another example, when the user shakes a hand side to side, the controller 180 can perform an operation corresponding to start for image grouping. When the user collects fingers, the controller 180 can perform an operation corresponding to capture and when the user shakes a hand, the controller 180 can perform an operation corresponding to end of image grouping.

In still another example, when the user inputs 'S' in memo command window displayed on the display module 151, the controller 180 can recognize 'S' and perform an operation corresponding to start for image grouping. When the user inputs 'T', the controller 180 can perform an operation corresponding to capture and when the user inputs 'E', the controller 180 can perform an operation corresponding to end for image grouping.

The voice recognition, the motion recognition and the memo recognition described above has been explained as an example, and the present invention is not limited that.

When the first image 410, the second image 420 and the third image 430 are stored in one group, the controller 180 can set a first tag as the group name. A detail description of this will be given in FIGS. 10 to 13.

For example, for linking a memo function, the first tag can be input to the display module 151 by a touch pen or a finger. Also, the first tag can be input by using a keypad. When the first tag is input in form of free note by using the memo function, the controller 180 can recognize only text among input memo.

For example, as illustrated in FIG. 10(a), when a memo 'happy♥' is input, the controller 180 can recognize only text 'happy' among the memo and can display message asking if the user wants to set 'happy' to the group name.

As illustrated in FIG. 10(c), when the first tag input is same an existing group name, the captured image can be stored in the existing group. The controller 180 can set the existing group name added number to the group name or can display a re-input object for being input a group name again.

The mobile terminal 100 can allow the user to input the first tag before or after start input for image grouping and before or after end input of image grouping. The input first tag can be set not only to the group name but also a file name.

Figure 11:
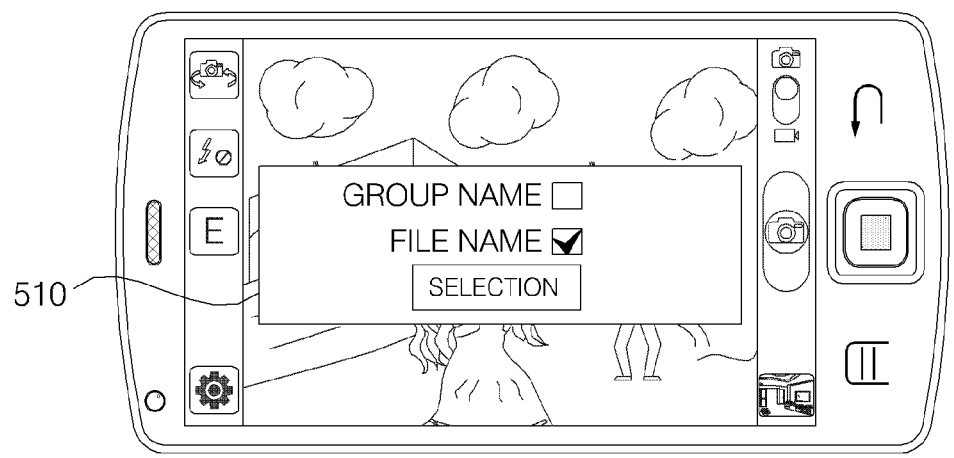

For example, when the first tag is input, the controller 180 can display a message asking whether the user set the first tag to the group name or a file name of the first image, as illustrated in FIG. 11. In this instance, the mobile terminal 100 can allow the user to select at least one of the group name and the file name.

When a file name of captured image is not input, a group name of a group including the captured image can be set as the file name of the captured image or a last input file name can be set as the file name of the captured image.

For example, as illustrated in FIG. 12, when the user captures the first image 410, the second image 420 and the third image 430 in order, the user can input a first tag 'happy♥' as a file name of the first image 410, cannot input a file name of the second image 420, and can input a second tag "travel" as a file name of the third image 430.

In this instance, the first tag 'happy' input as the file name of the first image 410 can be set as the file name of the second image. The file names of the first image and the second image be added a number according to a captured order.

Figure 13:
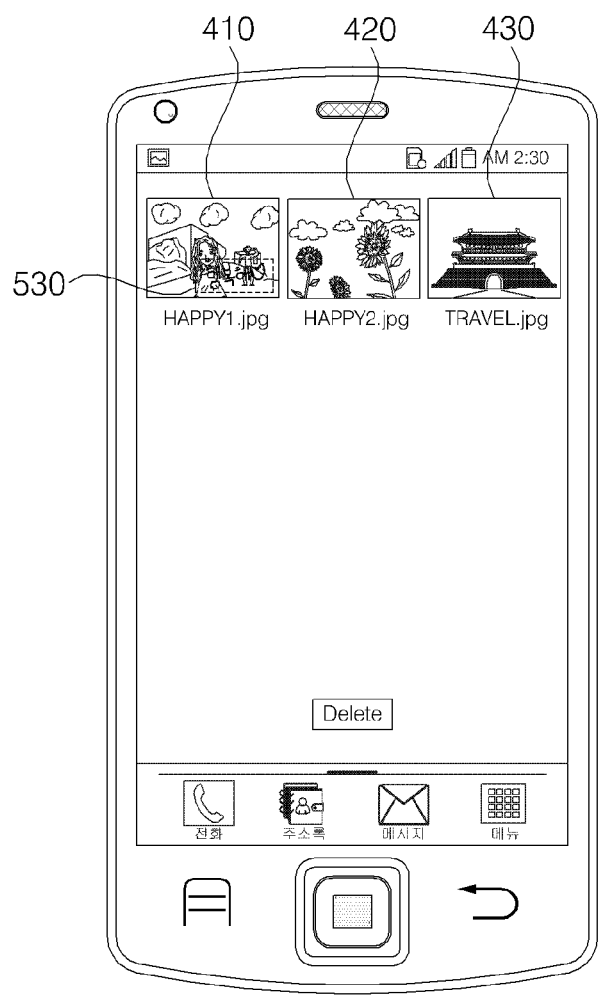

As shown in FIG. 13, the first image 310 can be stored with the file name as 'happy 1', the second image 420 can be stored with the file name as 'happy 2', and the third image 430 can be stored with the file name as 'travel'.

The input first tag can be stored with the captured image to be displayed on a predetermined region of the captured image. For example, as illustrated in FIG. 13, the first tag as 'happy' can be displayed a predetermined region of the first image 410.

Figure 14:
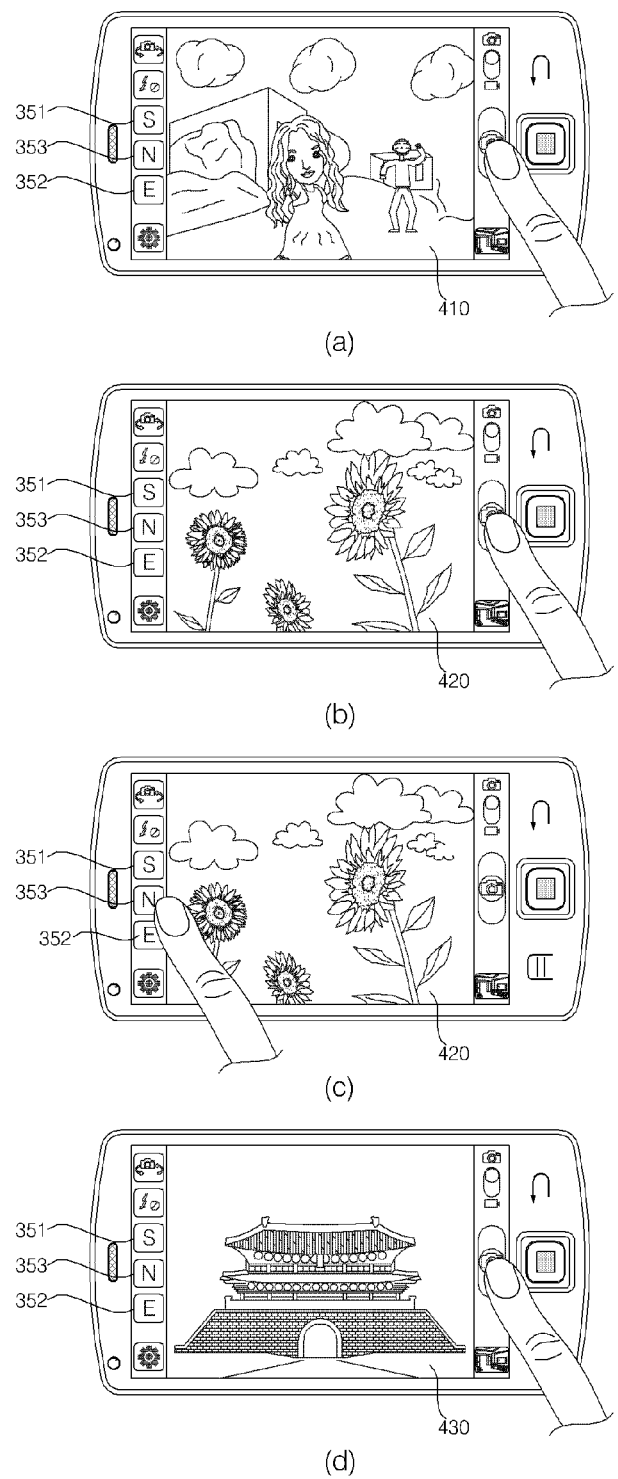
Figure 15:
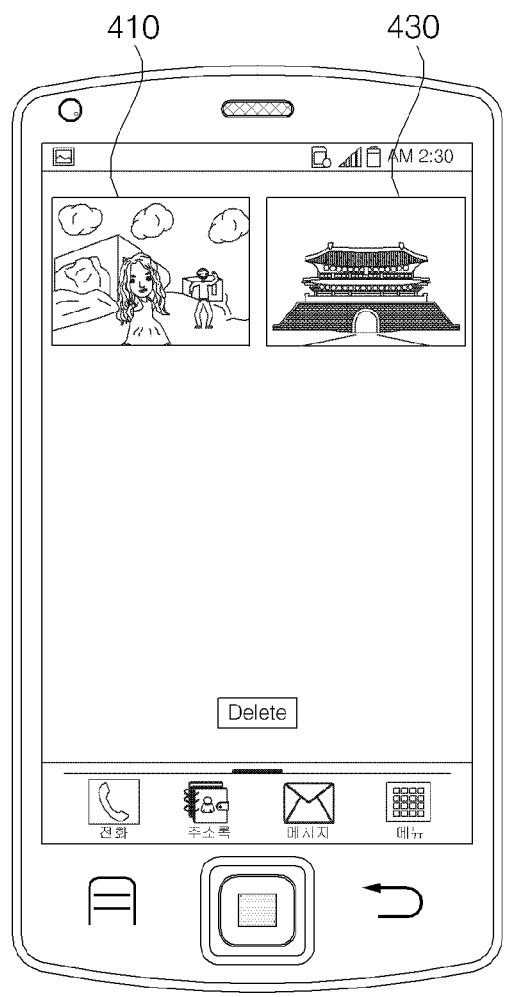

FIG. 14 and FIG. 15 are views illustrating the method for operating of the mobile terminal according to an embodiment of the present invention, more specifically a skip function of image grouping.

Referring to FIG. 14, when the mobile terminal 100 enters into the capture mode, a skip or next object 353 corresponding to the skip function can be displayed additional to the start object 351 and the end object 352. When the mobile terminal 100 receives input selecting the skip object 353, an image captured just before selecting the skip object 353 is not stored in a group.

For example, the user can select the start object 351 and capture the first and second image 410 and 420 in order as illustrated in FIG. 14(a) and (b). The user can select the skip object 353 after capturing the second image 420 as illustrated in FIG. 14(c) and can capture the third image 430 and select the end object 352 after capturing the third image 430.

In this instance, the second image 420 captured just before selecting the skip object 353 is not stored in a group in which the first image 410 and the third image 430 are stored as shown in FIG. 15. The second image 420 can be deleted or can be stored in other group. Accordingly, when an image captured is unsatisfactory, the user cannot store the image in same group by using the skip function.

Figure 16:
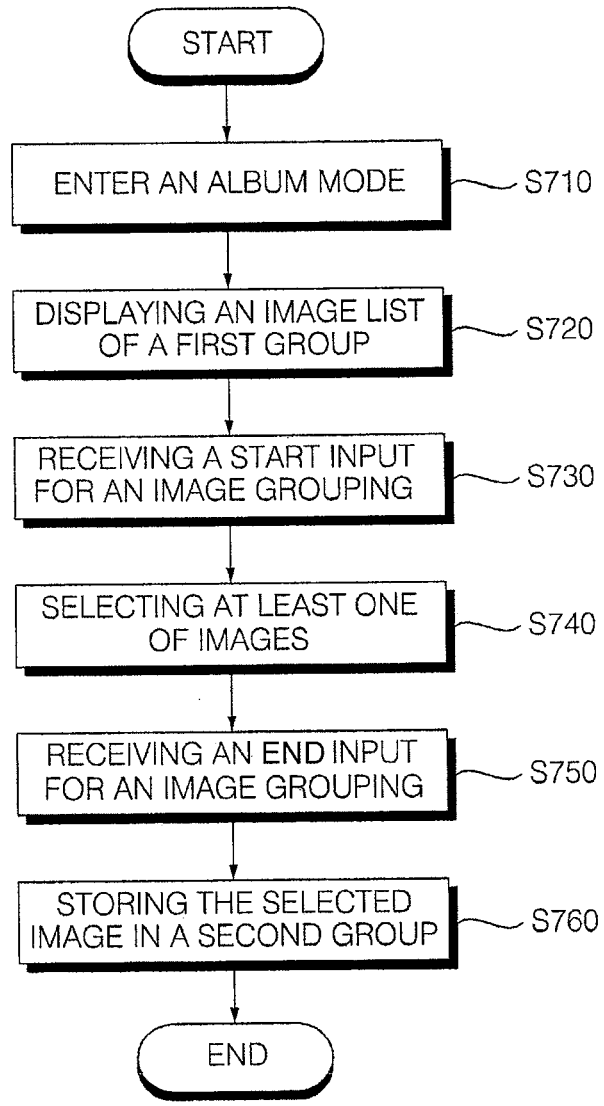
FIG. 16 is a flowchart illustrating a method for operating the mobile terminal according to an embodiment of the present invention.
Figure 17:
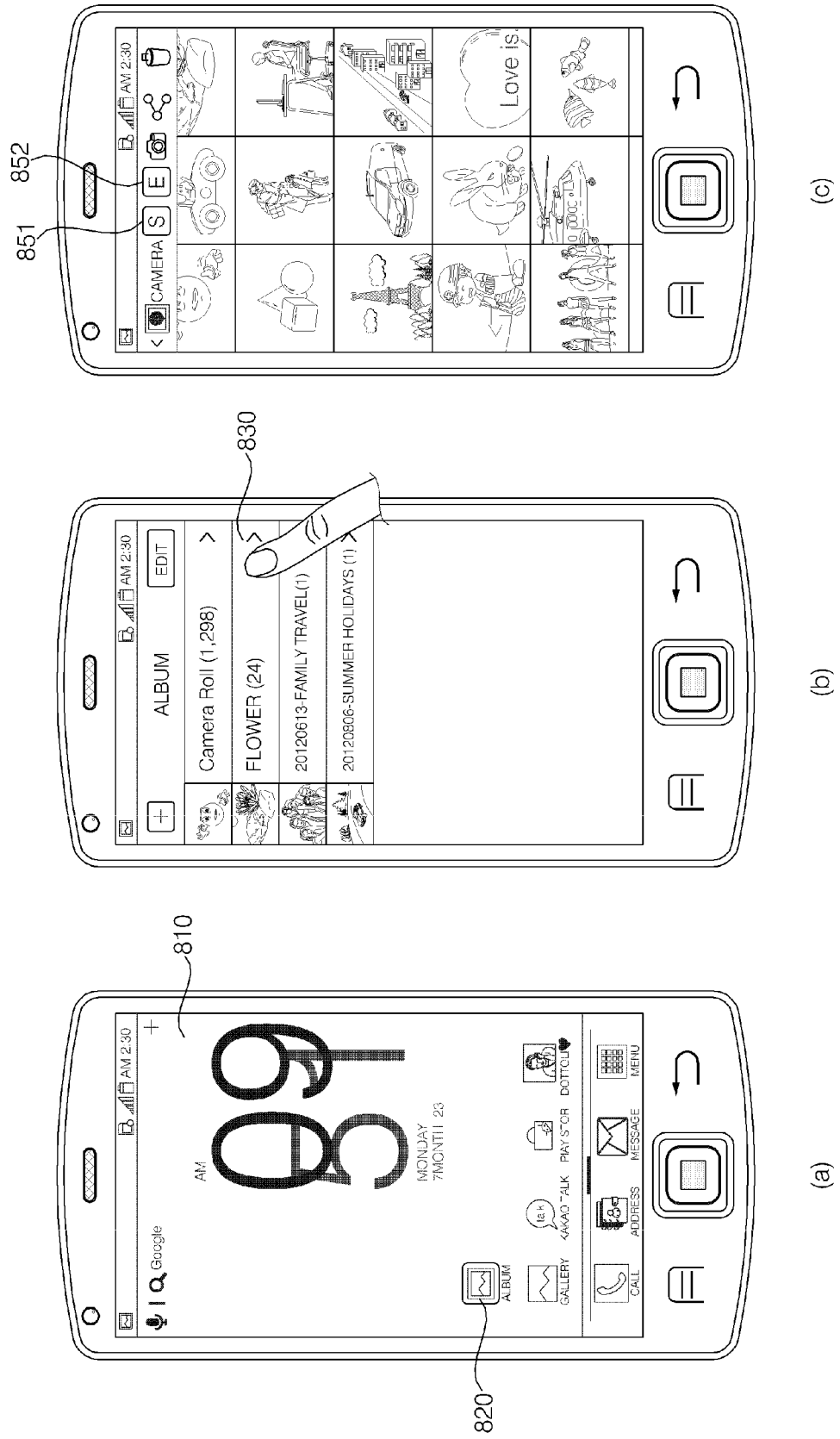

FIG. 16 is a flowchart illustrating a method for operating the mobile terminal according to an embodiment of the present invention and FIGS. 17 to 20 are views referred to for describing the method for operating the mobile terminal, illustrated in FIG. 16.

Referring to FIG. 16, the mobile terminal 100 can enter into an album mode (S710) and can display a list of a first group including a plurality of images on the display module 151 (S720). For example, as illustrated in FIG. 17(a), the mobile terminal 100 can execute the album program by input such as selecting an album application in menu screen and the like and can enter into the album mode.

When the mobile terminal 100 enters into the album mode, as illustrated in FIG. 17(b), at least one of image groups is displayed on the display module 151. For example, when a first group 830 of above image groups is selected, a plurality of images stored in the first group can be displayed in form of list.

Related to an embodiment of the present invention, the start object 851 and the end object 852 for image grouping can be displayed on the display module 151.

As described above in FIGS. 6 and 7, the start object 851 and the end object 852 can be displayed at the same time and when the start object 851 is selected, the end object 852 can be activated. When the start object is selected, the start object can be changed to the end object 852.

Referring to FIG. 16, the controller 180 can receive the start input (S730), and receive input for selecting at least one of a plurality of images (S740). For example, as illustrated FIG. 18(a), the user can select at least one of a plurality of images displayed on the display module 151. In this instance, the selected image can be highlighted, bold lines can be displayed on borders of the image, or a check can be displayed in the image.

Figure 19:
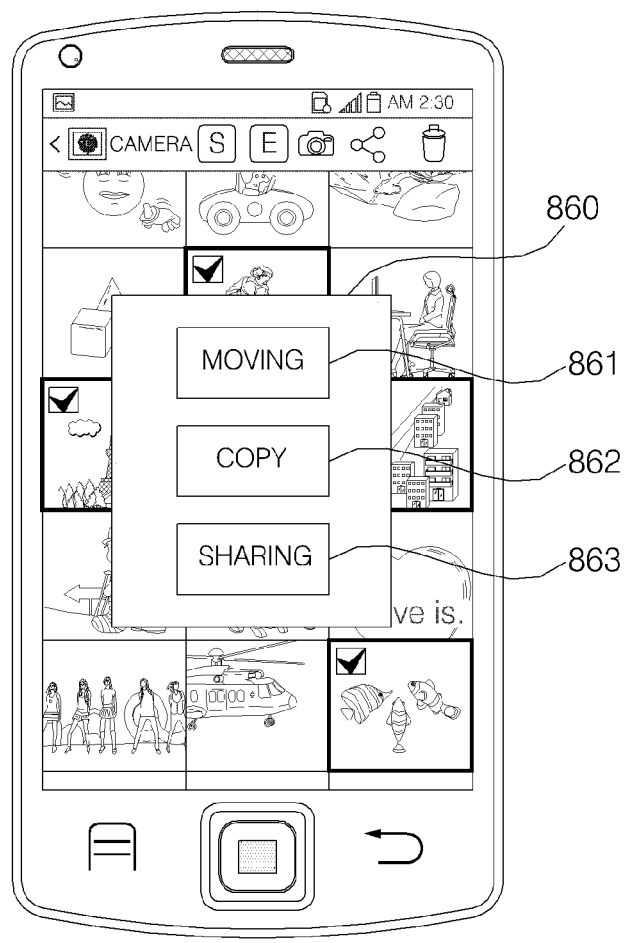
Figure 20:
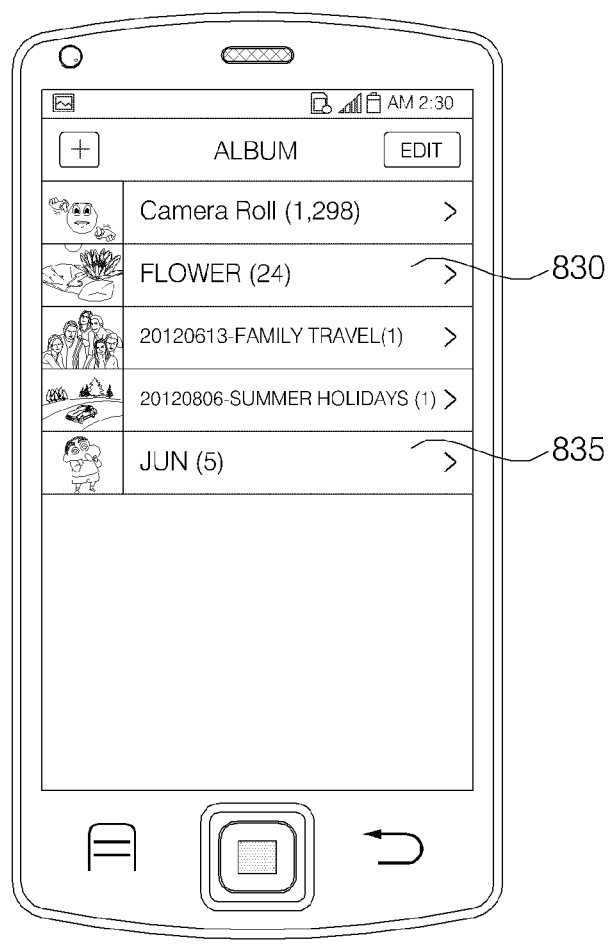

When at least one of the images is selected and the mobile terminal 100 receives the end input for image grouping (S750), the selected image can be stored in a second group (S760). For example, as illustrated in FIG. 18(c), when the end object 852 is selected, a menu screen 860 including objects 861, 862 and 863 corresponding to moving function, copy function and sharing function can be displayed on the display module 151, as illustrated in FIG. 19.

When the moving object 861 and the copy object 862 are selected, the image selected as the second group can be stored in an existing folder or the user can create a new folder 835 and the image can be stored the new folder 835. When the new folder can be created, the folder name can be input.

The user can input the folder name on the display module 151 in connecting memo function by using a touch pen, finger, or key pad. In addition, the selected image can be stored to display in order or reverse order of being selected. The selected images can be stored as one image integrated the selected images.

When the moving object 862 is selected, the image selected as the second group can be deleted from the first group 830 and can be moved to the second group 835. When the copy object 862 is selected, the image selected as the second group can be copied from the first group 830 to the second group 835.

According to an embodiment of the present invention, the captured image can be effectively stored and managed by the image grouping function in the capture mode and the album mode. Therefore, the image grouping function can increase a convenience of use of the mobile terminal.

The mobile terminal and the method for operating the same according to the foregoing exemplary embodiments are not restricted to the exemplary embodiments set forth herein. Therefore, variations and combinations of the exemplary embodiments set forth herein can fall within the scope of the present invention.

The method for operating a mobile terminal according to the foregoing exemplary embodiments can be implemented as code that can be written on a computer-readable recording medium and thus read by a processor. The computer-readable recording medium can be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details can be made therein without departing from the spirit and scope of the present invention as defined by the following claims.

What is claimed is:

1. A method for controlling a mobile terminal, the method comprising:
    entering, via a camera of the mobile terminal, a capture mode;
    displaying, via a display unit of the mobile terminal, a first object corresponding to a start input for starting a grouping image process;
    starting, via a controller of the mobile terminal, the grouping image process in response to a selection of the first object;
    capturing, via the camera, at least one image;
    when a memo is input on the at least one captured image by a touch pen or a finger, recognizing text among the memo as a first tag;
    ending the grouping image process in response to a selection of a second object displayed on the display unit, wherein the second object corresponds to an end input for ending the grouping image process; and
    storing, in a memory associated with the mobile terminal, the at least one image captured between the start input and the end input in a group,
    wherein the first tag is set to at least one of a group name of the group or file names of the captured images of the group,
    wherein in response to the selection of the first object, the method further comprises visually changing and displaying the first object to the second object, and
    wherein in response to the selection of the second object, the method further comprises visually changing and displaying the second object to the first object.

2. The method according to claim 1, further comprising:
    displaying a message asking if the first tag is set to the group name of the group; and
    setting, via the controller, the input first tag as the group name of the group according to a user input.

3. The method according to claim 1, wherein when the first tag is input as a file name of a first image among a plurality of captured images and a second tag is input as a file name of a third image among the plurality of captured images, the first tag is set as the file names of the first image and a second image, and the second tag is set as the file name of the third image.

4. The method according to claim 2, wherein if the at least one captured image includes a plurality of captured images, the method further comprising adding a capture order number to the first tag and setting file names of the captured images using the first tag and the added capture order number.

5. The method according to claim 2, wherein the first tag is displayed on a predetermined region of the at least one captured image.

6. The method according to claim 2, further comprising:
receiving, via the controller, a second tag input; and
setting, via the controller, the second tag as a file name of the at least one captured image.

7. A method for controlling a mobile terminal, the method comprising:
entering, via a camera of the mobile terminal, a capture mode;
displaying, via a display unit of the mobile terminal, a first object corresponding to a start input for starting a grouping image process;
starting, via a controller of the mobile terminal, the grouping image process in response to a selection of the first object;
capturing, via the camera, at least one image;
ending the grouping image process in response to a selection of a second object displayed on the display unit, wherein the second object corresponds to an end input for ending the grouping image process; and
storing, in a memory associated with the mobile terminal, the at least one image captured between the start input and the end input in a group,
wherein in response to the selection of the first object, the method further comprises visually changing and displaying the first object to the second object, and
wherein in response to the selection of the second object, the method further comprises visually changing and displaying the second object to the first object.

8. The method according to claim 1, further comprising:
receiving, via the controller, a skip command for skipping the grouping image process for a particular captured image; and
not storing an image captured just before receiving the skip command in the group.

9. A method for controlling a mobile terminal, the method comprising:
entering, via a controller of the mobile terminal, an album mode;
displaying, via a display unit of the mobile terminal, a list of images included in a first group;
displaying, via the display unit, a first object corresponding to a start input for starting a grouping image process;
starting, via the controller, the grouping image process in response to a selection of the first object;
receiving, via the controller, a selection signal indicating a selection of at least one image in the list of images;
ending the grouping image process in response to a selection of a second object displayed on the display unit, wherein the second object corresponds to an end input for ending the grouping image process; and
creating a new folder according to a user input;
when a memo is input by a touch pen or a finger, setting a name of the new folder based on the input memo; and
storing, in a memory associated with the mobile terminal, the selected at least one image between the start input and the end input to the new folder,
wherein in response to the selection of the first object, the method further comprises visually changing and displaying the first object to the second object, and
wherein in response to the selection of the second object, the method further comprises visually changing and displaying the second object to the first object.

10. The method according to claim 9, further comprising: deleting the selected at least one image from the first group.

11. The method according to claim 9, further comprising: storing the selected images such that that the selected at least image is displayed in an order selected or in a reverse order selected.

12. The method according to claim 9, wherein the selected images are combined into one image and the combined image is stored.

13. A mobile terminal, comprising:
a camera configured to enter a capture mode;
a display unit configured to display a first object corresponding to a start input for starting a grouping image process;
a controller configured to start the grouping image process in response to a selection of the first object, capture via the camera at least one image, and end the grouping image process in response to a selection of a second object displayed on the display unit, wherein the second object corresponds to an end input for ending the grouping image process; and
a memory configured to store the at least one image captured between the start input and the end input in a group,
wherein when a memo is input on the at least one captured image by a touch pen or a finger, the controller is configured to recognize text among the memo as a first tag, and set the first tag to at least one of a group name of the group or file names of the captured images of the group,
wherein in response to the selection of the first object, the controller is further configured to visually change and display the first object to the second object, and
wherein in response to the selection of the second object, the controller is further configured to visually change and display the second object to the first object.

14. The mobile terminal according to claim 13, wherein the controller is further configured to display message asking if the first tag is set to the group name of the group and, and set the first tag as the group name of the group according to a user input.

15. The mobile terminal according to claim 14, wherein when the first tag is input as a file name of a first image among a plurality of captured images and a second tag is input as a file name of a third image among the plurality of captured images, the controller is configured to set the first tag as the file names of the first image and a second image, and to set the second tag as the file name of the third image.

16. The mobile terminal according to claim 14, wherein if the at least one captured image includes a plurality of captured images, the controller is further configured to add a capture order number to the first tag and set file names of the captured images using the first tag and the added capture order number.

17. The mobile terminal according to claim 14, wherein the first tag is displayed on predetermined region of the captured image.

18. The method according to claim 9, when the memo is input on the selected at least one image by the touch pen or the finger, text among the memo is recognized and the name of the new folder is set based on the recognized text.

* * * * *